United States Patent
Werner

(10) Patent No.: US 7,933,863 B2
(45) Date of Patent: Apr. 26, 2011

(54) DATABASE SYSTEM AND METHOD FOR MANAGING A DATABASE

(75) Inventor: Horst Werner, Rettigheim (DE)

(73) Assignee: SAP AG, Walldorf (DE)

( * ) Notice: Subject to any disclaimer, the term of this patent is extended or adjusted under 35 U.S.C. 154(b) by 944 days.

(21) Appl. No.: 11/048,699

(22) Filed: Feb. 3, 2005

(65) Prior Publication Data

US 2005/0203963 A1   Sep. 15, 2005

(30) Foreign Application Priority Data

Feb. 3, 2004   (EP) .................................... 04075324

(51) Int. Cl.
*G06F 17/00*   (2006.01)
(52) U.S. Cl. ........ 707/607; 707/735; 707/756; 707/802; 707/955; 707/960
(58) Field of Classification Search .................. 707/607, 707/735, 756, 792, 802, 955, 960
See application file for complete search history.

(56) References Cited

U.S. PATENT DOCUMENTS

| | | | |
|---|---|---|---|
| 6,625,613 B2 * | 9/2003 | Thompson | 1/1 |
| 7,231,388 B2 * | 6/2007 | Matsubayashi et al. | 707/5 |
| 2002/0083169 A1 * | 6/2002 | Aki et al. | 709/224 |
| 2004/0186738 A1 * | 9/2004 | Reisman | 705/1 |

* cited by examiner

*Primary Examiner* — Sana Al-Hashemi
(74) *Attorney, Agent, or Firm* — Finnegan, Henderson, Farabow, Garrett & Dunner LLP

(57) ABSTRACT

A database management system and a method of managing a database storing a plurality of entities related to each other by a plurality of relations. The database management system includes a user interface for interfacing with the database in a current situation. The system also includes a context modeler for modeling a context representation and a server for storing a situation in which the user has been involved as at least one frame. The at least one frame describes at least one object and action involved in the situation in which the user has been involved and their relationship to each other. A context using the at least one frame is modeled by the context modeler so that when the context representation is applied to the database, operation of the database is adapted according to the situation.

21 Claims, 3 Drawing Sheets

DATABASE SYSTEM AND METHOD FOR MANAGING A DATABASE

This application is based upon and claims the benefit of priority from prior patent application EP 04075324.6, filed Feb. 3, 2004, the entire contents of which are expressly incorporated herein by reference.

BACKGROUND

I. Technical Field

The present invention relates to a database management system and a method of managing a database.

II. Background Information

Applications, such as business applications, allow a user to work in different contexts. Such applications adapt the information displayed, and the actions or objects, which the user may select, according to a respective context. However, the context is not explicitly modeled. Instead, it is implicitly given by the various screens of an application's user interface. Limited context information is kept when the user switches to another screen. While some applications use lists of recently or frequently used objects, the relationship of these objects with respect to the user's activities is unknown to the application.

Therefore, conventional applications provide context information that is poor and unavailable for generic algorithms. Instead, the context sensitivity has to be hard coded for each screen. Embodiments consistent with the present invention address problems encountered with conventional applications, improve context representations in applications, and improve the relevance of data displayed to a user in a situation.

SUMMARY

Consistent with the present invention, a database management system is provided for managing a database. The system comprises a database storing a plurality of entities related to each other by a plurality of relations; a user interface for interfacing with the database in a current situation; a context modeler for modeling a context representation; and a server for storing a situation in which the user has been involved as at least one frame. The at least one frame describes at least one object and action involved in the situation in which the user has been involved and their relationship to each other. The context modeler models a context using the at least one frame so that when the context representation is applied to the database, operation of the database is adapted according to the situation.

Also consistent with the present invention, a method is provided of managing a database storing a plurality of entities related to each other by a plurality of relations. The database is associated with a user interface. The method comprises storing a situation in which the user has been involved as at least one frame, wherein the at least one frame describes at least one object and action involved in the situation in which the user has been involved and their relationship to each other; and modeling a context representation, wherein at least one frame is used so that when the context representation is applied to the database, operation of the database is adapted according to the situation.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
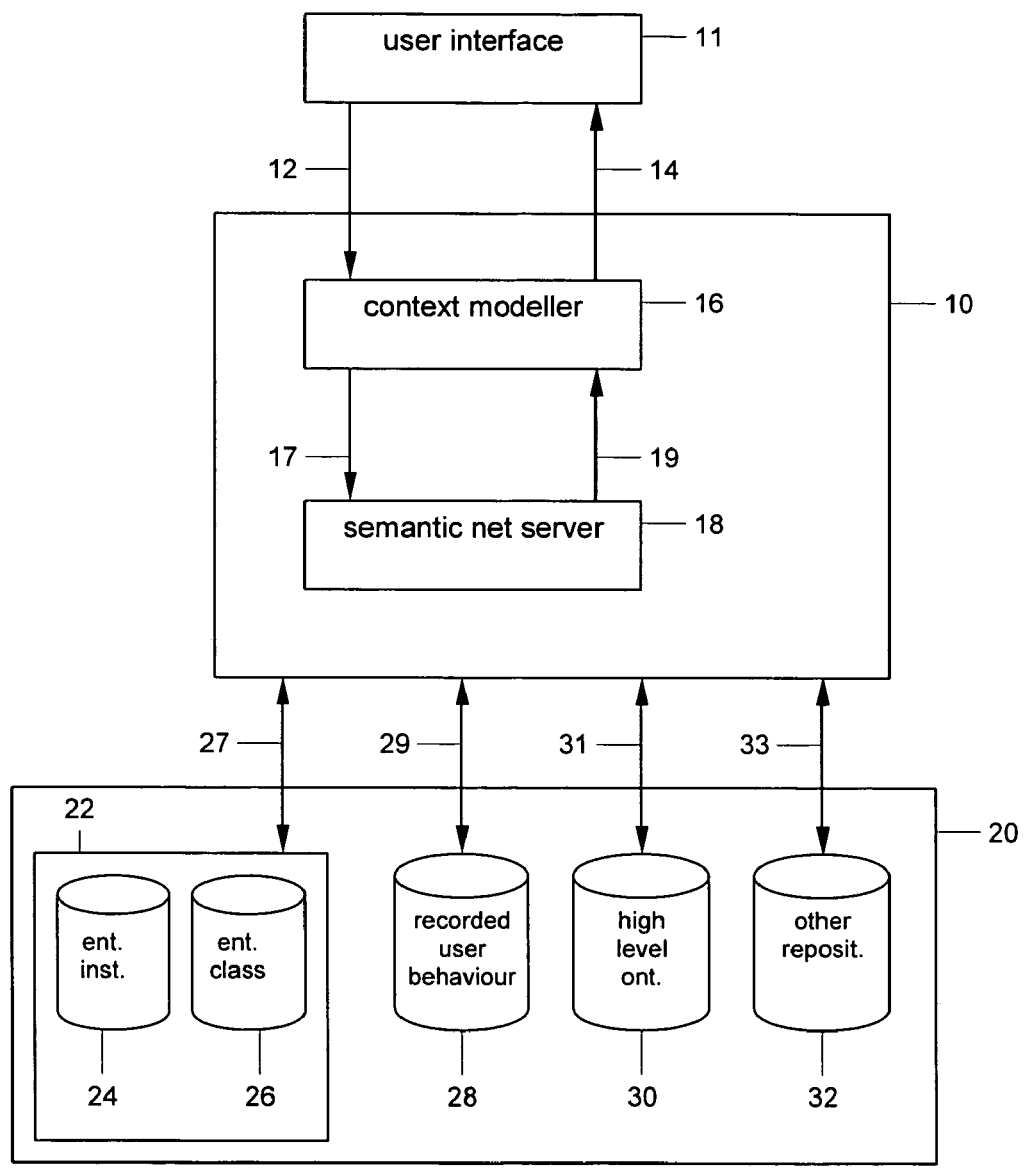
FIG. 1 shows an architecture incorporating an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 2:
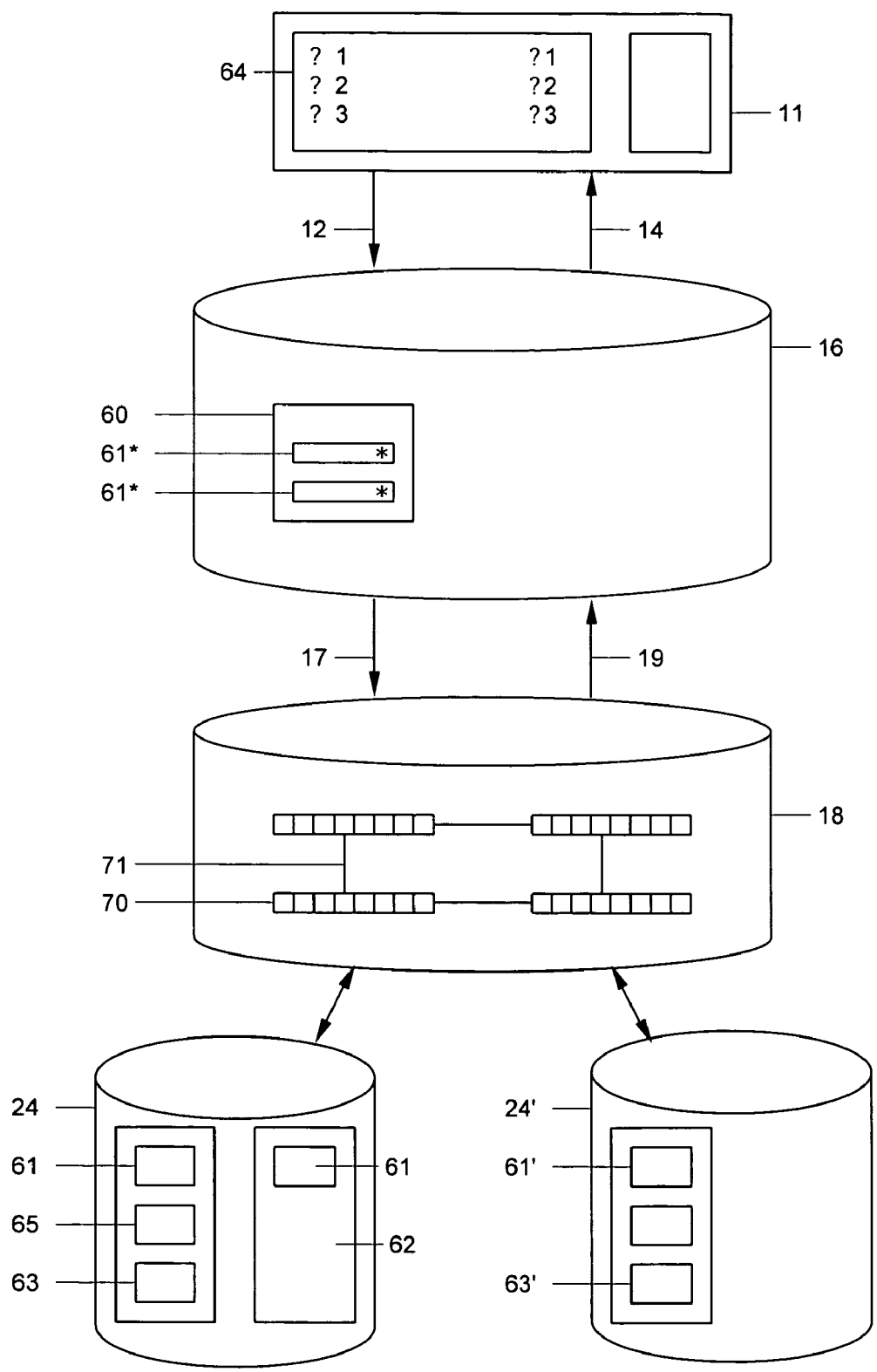
FIG. 2 shows aspects of the architecture of FIG. 1 in further detail.

FIG. 1 shows an architecture incorporating an embodiment of the present invention. FIG. 2 shows aspects of the architecture shown in FIG. 2 in further detail. With reference to FIGS. 1 and 2, system 10 is shown on which the process described hereinafter may be implemented. System 10 includes a context modeler 16 and a uniform representation server 18. System 10 may typically be associated with a user interface 11 that is a graphic user interface (GUI) with which a user interact. Typically, at any one time the user is involved in a situation that may include an action or a process 12 or both. System 10 is also typically associated with a database 20 that may form part of a business application. System 10 manages database 20.

Situation 64 is defined by at least one of an action and process 12 is input to context modeler 16. Data may be exchanged via connections 12 and 14 between user interface 11 and context modeler 16. Similarly, data may be exchanged via connections 17 and 19 between context modeler 16 and uniform representation server 18.

In operation, context modeler 16 determines which entities 61* are to form context representation 60. Context representation 60 typically includes at least one entity 61*. The context of an entity or a situation as defined by the process or action is a collection of facts and entities 61 which are of special importance for that entity or situation and which usually have a direct or indirect relationship to the entity or situation. Within a business application, such as a business application in which a database is provided, a context may be defined for a variety of entities 61 or a situation including, but not limited to a user, a session or a business entity. For a user the context may include entities 61 including his role, projects, personal preferences, etc. For a session the context may include entities 61 including a user, last actions, manipulated business entities 61, etc. For a certain business object of the business application, the context may include entities 61 including past projects, orders for a customer, etc. As will be described hereinafter a business object is typically an entity 61, 61' stored in a database. A business application 20 may typically include a database 22 in which business entities 61 are stored.

A combination of different contexts, for example a user context and a session context, may be combined to form a current context within a session. The elements 61* ("elements" are referred to as being entities 61 belonging to a group of entities 61) of such a composed context may have different temporal validities. The temporal validity may be defined by system 10 and/or by a user. For example, there are long-term elements such as the industry branch of the user's company, the user's role in that company, his current projects, his activities in the last few days. Similarly, there are short term elements such as, but not limited to the current transaction, entities 61 displayed or manipulated in the current session, etc.

Technically, context may be represented by a number of instances of business entities 61, processes/actions, or situations. A situation may be defined by at least one or a process or action.

As mentioned above, context modeler 16 identifies context elements or entities 61, and entities 61 related to these for the context representation 60. In a typical relational database 22, a plurality of entities are stored in a plurality of tables in accordance with their entity type. In order for entities from different tables to be included in the context representation modeled by the context modeler 16, a uniform representation server 18 is provided to store in a uniform representation the entities from different tables. In a preferred embodiment, the uniform representation server 18 includes a representation which, in addition to providing a uniform representation of the entities, stores the relations between the different entities. In a particular embodiment, uniform representation server 18 is a semantic net server.

Within database 22, there are representations of business entities 61 which are related to each other. This relation can be explicitly modeled in the database. In this case it is called first level relatedness. The relatedness can also be implicitly contained by the database if there is an intermediate business object to which two other business entities 61 are related. This would be second level relatedness. Other chains of relations between business entities 61 can be found and depending on the length of such a chain there is third level and fourth level relatedness, and so on.

A problem encountered in evaluation of relatedness of second and higher levels is the huge amount of data that must be evaluated. If an average entity is (directly) related to 20 other entities 61, there are 400 entities 61 with a second level relatedness, 8000 third-level-related entities 61 and 160,000 fourth-level-related entities 61. So if higher-level relatedness is to be displayed to the user, an intelligent selection of relevant entities 61 needs to be performed. The relevance of entities 61 is context dependent. Context modeler 16 ascertains the relevance of the entities 61 to determine the limited object set to be evaluated.

In another embodiment, the relatedness between two entities 61 may be not at all in the database model but in the mind of the user. This kind of relatedness is included into a database, according to an embodiment of the present invention, if an appropriate mechanism is provided that works independently of the database's entity relationship model. For example, an independent mechanism may be explicitly declared by the user or deduced from his behavior, as described herein below.

As mentioned, context modeler 16 identifies the context representation from a uniform representation stored in uniform representation server 18. As mentioned, context modeler 16 may identify the context representation from a semantic net representation stored in a semantic net server. A semantic net is a data structure made up of nodes and relations between those nodes. The nodes represent terms and they are embedded in abstraction hierarchy by means of the special relation type "is a". A semantic net is the common way of representing ontologies in a computer system.

In conventional applications, semantic nets are used as an abstraction layer to search and navigate in database contents. In contrast, according to an embodiment of the present invention, context is modeled in a business application by storing in the manner described herein below, context-relevant entities 61 and entities 61 related to these by means of a semantic net. Representations of processes and actions are integrated in this data structure as well as a general knowledge ontology. It is noted that an ontology is an explicit specification of a conceptualization. A conceptualization is an abstract, simplified view of the world it is desired to represent for some purpose. An ontology contains the vocabulary (terms or labels) and the definition of the concepts and their relationships for a given domain. An ontology is a representation that exists independent of any computer models or implementations.

Process or action 12 may include a request to have certain data represented or displayed from database 22 which forms part of an application. For example, the application may be a business application or any other appropriate application. In FIG. 1 a business application 20 is shown. The business application includes a database 22 in which business entities 61 are stored. Entity instances are stored in a first storage medium 24. Entity classes are stored in a second storage medium 26. The business application 20 further includes a recorded user behavior storage medium 28 for storing user behavior, a high level ontology storage medium 30 for storing a high level ontology, and other repositories 32 for storing other data. Database 22, recorded user behavior storage medium 28, high level ontology storage medium 39, and other repositories 32 may exchange data with the user interface 10 via communication links 27, 29, 31, and 33, respectively.

Having initiated a process or action, the user receives an output in the form of a delivery of data 14 from database 22 representing the results of the process or action. The delivery of data 14 is influenced in accordance with the context representation modeled by context modeler 16. In particular, the user's behavior is observed by system 10, in particular in terms of actions 66 and processes 65 being carried out, and is used by context modeler 16 to model the context representation.

In the example, only one database is shown. Context modeler 16 may be arranged to model a context representation to influence the delivery of data from at least one database. For example, a plurality of databases may be influenced by the context representation modeled by context modeler 16.

FIG. 2 shows a plurality of entities 61 stored in a first storage medium 24 and a plurality of entities 61' stored in a second storage medium 24'. In each storage medium 24, 24', a plurality of entities 61, 61' are stored in at least one table 62, 63, 63', respectively. For the case that the entities 61 form a group, one entity within that group is referred to as an element 65. Uniform representation server 18 stores a uniform representation of the entities 61, 61'.

Further, with reference to FIG. 2, the user is typically involved with procedures that may include processes and/or actions shown by triangle 1, 2, 3 and circle 1, 2 and 3. The procedures give rise to a situation 64. Context modeler 16 observes the behavior of the user in terms of the procedures carried out. Context modeler 16 models the context in response to the situation using the uniform representation stored in uniform representation server 18. Representations of a situation in which the user has been involved are stored in uniform representation server 18. They may be typically stored in terms of entities 61 involved or associated with each particular process and/or action. A uniform representation of the procedures followed is formed. If a semantic net server is used, the relations between the representations of the processes and actions are included. Context modeler 16 identifies the entity or entities 61 relevant to the particular processes and actions being followed at a particular moment in time and models a context representation to include the identified entity or entities 61.

In accordance with an embodiment, context modeler 16 uses uniform representation server 18 to determine a context representation in a current situation. In order for a system to reproduce the context of a user, in contrast to conventional systems, a persistence is desirable for current and past situations in which the user has been involved. Such a persistence has been found to be a desirable prerequisite for modeling user preferences and best practices. This has been achieved, according to an embodiment consistent with the present invention in the following way: each of the current and previous situations is represented by a number of frames 70 describing objects or actions involved in the situation and their relationship 71 to each other.

A frame is a term, known to a person of ordinary skill, from artificial intelligence (AI), and represents a common pattern that occurs with different "actors" in fixed "roles." The frame comprises slots, wherein the roles are represented by the slots and the slots are filled with the actors in a specific instance of such a frame. In particular, with reference to the present invention, entities 61 form the contents of the slot. In particular, the frame is a data-structure for representing a current or previous situation. In other words, it is a representation of a pattern. In general terms, a frame may be compared to a "class" in object oriented programming (OOP). In one embodiment, the pattern represented by the frame can represent a single situation. Alternatively, the pattern represented by the frame may also be the essence of a large number of single situations. Therefore, the relations referring to the respective entities in the slots may carry various values. For example, the relations referring to the respective entities may carry a value indicating at least one of the probability and reliability of that relation. Further, another value can be set to characterize the importance of the respective relation in that situation. Also, these relations can be marked as causal or dependent relations, respectively. While the causal relations characterize a situation, the dependent relations may be considered as the deduction. The frames, relations and values for at least one of the situations the user has been involved with together with the current situation are stored in uniform representation server 18. In other words, the user's behavior is observed by system 10 and stored as frames. Context modeler 16 uses this information to model a current context. This approach ensures a seamless integration of predefined and learned rules for evaluation purposes.

In this way, the context representation not only represents the database contents but also the observed user behavior including the current situation. In a preferred embodiment, the user behavior is stored as frames in a semantic net. Full integration of the semantic net based context representation into the business application is achieved. Consistent with the present invention, the context sensitivity of applications, including databases, is enhanced, and irrelevant data is hidden from the user, thus allowing him to concentrate on the data most relevant to his situation. Further additional related data and/or actions are offered to the user. Consistent with the present invention, probable values of input fields are provided based on the context representation.

As mentioned above, according to an embodiment of the present invention, probable values for given input fields are determined and proposed by system 10. This is referred to as slot filling. For the purpose of slot filling, the system reduces the set of indirectly related entities 61 to those elements fitting in the given slot/input field by entity type and/or other required attributes. This is achieved by selecting from a large number of possible values only those that make sense in the current context. When doing so, the current context as modeled by context modeler 16 is taken into account.

The algorithm to identify relevant entities 61 in a large object set is a context sensitive filter and determines the intersection between the given large object set and the set of indirectly or directly related entities 61. In one embodiment, a database management system manages database 22, which stores a plurality of entities 61 related to each other by a plurality of relations 62. The database management system is associated with a user interface 11 for interfacing with the database 22 in a current situation 64. The database management system includes context modeler 16 for modeling a context representation and server 18 for storing a situation in which the user has been involved as at least one frame 70. The at least one frame 70 describes at least one object and action involved in the situation in which the user has been involved and their relationship to each other. Context modeler 16 models a context using the at least one frame 70 so that when the context representation is applied to the database 22, operation of database 22 is adapted according to situation 64. Accordingly, the context sensitivity of applications, such as databases, is enhanced.

In another embodiment, the data stored as at least one frame 70 is an observed user behavior. In this way, the user's behavior is taken into account by the context modeler to model the context representation. In yet another embodiment, server 18 is a uniform representation server, wherein the situation stored in the at least one frame 70 is stored in terms of a uniform representation of the entities stored in the database. In yet a further embodiment, uniform representation server 18 is a semantic net server and the plurality of frames are stored as a semantic net 70, 71. Accordingly, relationships between stored entities are stored in a uniform representation. In still yet a further embodiment, server 18 is arranged to store the current situation as at least one frame so that in a subsequent situation, context modeler 16 uses the current situation as well as the situation in which the user has been involved to model the context for the subsequent situation. As a result, past as well as the current situation are used in order to model a context representation.

In yet a further embodiment, the at least one frame 70 includes a plurality of slots in which entities are stored which are involved in the situation. Accordingly, a standard structure of the at least one frame is provided. In another embodiment, at least one entity 61 in at least one of the slots carries a value indicating the probability of the relation of the entity in the slot with respect to another entity in a related slot, and the context modeler 16 is arranged to assess the value. Furthermore, the at least one entity in at least one of the slots may carry a value indicating the reliability of the relation of the entity in the slot with respect to another entity in a related slot, and the context modeler 16 is arranged to asses the value.

The at least one entity in at least one of the slots may also carry a value indicating the importance of the relation of the entity in the slot with respect to another entity in a related slot in the situation described by frame 70, and context modeler 16 is arranged to assess the value. The at least one entity in at least one of the slots may carry a value indicating that the relationship of the entity in the slot with respect to another entity in a related slot is at least one of causal and dependent, and the context modeler 16 is arranged to assess the value.

Accordingly, by assigning and assessing values to certain entities representing certain parameter, context sensitivity is enhanced.

Figure 3:
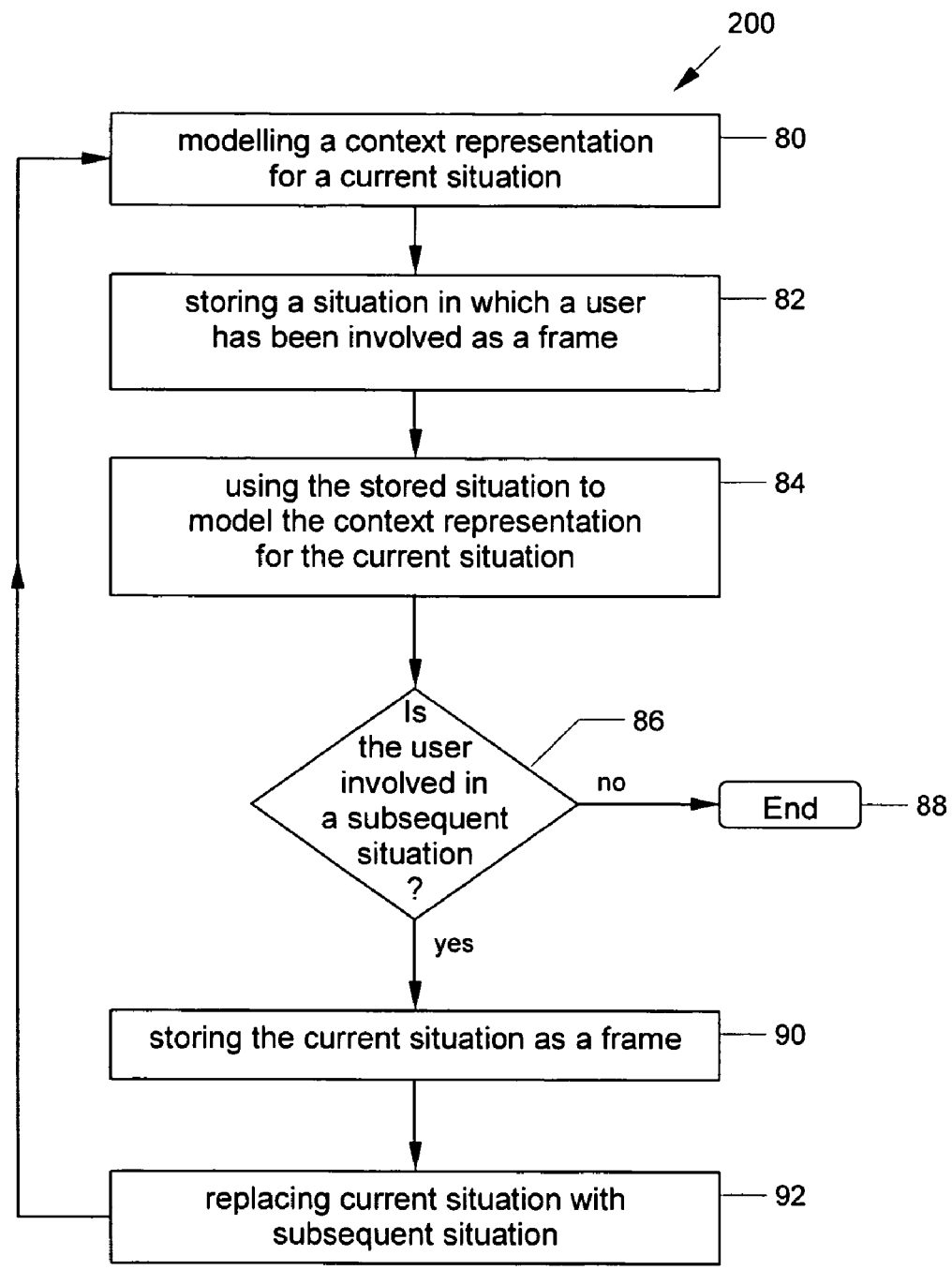
FIG. 3 shows a flow diagram incorporating a method of managing a database according to an embodiment of the present invention.

FIG. 3 shows a flow diagram incorporating a method of managing a database according to an embodiment of the present invention. Process 200 is shown including the steps of modeling a context representation for a current situation (step 80), storing a situation in which a user has been involved as a frame (step 82), and using the stored situation to model the context representation for the current situation (step 84). If the user is not involved in a subsequent situation (step 86), the process comes to an end (step 88). If the user is involved in a subsequent situation (step 86), the process includes the step of storing the current situation as a frame (step 90) and replacing the current situation with the subsequent situation (step 92). Having replaced the current situation with the subsequent situation, the process returns to step 80 to model a context representation for the new current situation.

In another embodiment, a method of managing a database 22 is provided. In this embodiment, database 22 stores a plurality of entities 61 related to each other by a plurality of relations 62. Database 22 is associated with a user interface 11 for interfacing with the database 22 in a current situation 64. The method includes modeling a context representation and storing a situation in which the user has been involved as at least one frame 70. The at least one frame 70 describes at least one object and action involved in the situation in which the user has been involved and their relationship to each other. Modeling a context representation includes using the at least one frame so that when the context representation is applied to database 22, operation of database 22 is adapted according to situation 64.

A further embodiment includes the step of storing the situation as at least one frame 70 representing an observed user behavior. A further embodiment includes the further step of storing the situation 64 in the at least one frame 70 in terms of a uniform representation of the entities stored in the database. In a further embodiment the storing step includes storing the plurality of frames as a semantic net 70, 71. In a yet further embodiment, the storing step stores the current situation as at least one frame 70, so that in a subsequent situation the current situation as well as the situation in which the user has been involved are used by context modeler 16 to model the context for the subsequent situation. A still further embodiment includes the further step of arranging the at least one frame to include a plurality of slots in which entities are stored which are involved in the situation.

A further embodiment includes the further steps of assigning a value to at least one entity in at least one of the slots indicating the probability of the relation of the entity in the slot with respect to another entity in a related slot, and assessing the value in the modeling step. Further, the further steps of assigning a value to at least one entity in at least one of the slots indicating the reliability of the relation of the entity in the slot with respect to another entity in a related slot, and assessing the value in the modeling step may be carried out. Further, the further step of assigning a value to at least one entity in at least one of the slots indicating the importance of the relation of the entity in the slot with respect to another entity in a related slot in the situation described by the frame, and assessing the value in the modeling step may be carried out. Still further, the step of assigning a value to the at least one entity in at least one of the slots indicating that the relationship of the entity in the slot with respect to another entity in a related slot is at least one of causal and dependent, and assessing the value in the modeling step may be carried out.

The present invention has application to a user terminal comprising means operable to perform any of the methods described. The present invention has application to a program storage device readable by a processing apparatus, said device embodying a program of instructions executable by the processor to perform the steps of any one of the methods described.

The invention as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While certain features and embodiments consistent with the invention have been described, other embodiments consistent with the invention will be apparent to those skilled in the art from consideration of the specification and practice of the embodiments consistent with the invention disclosed herein. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A database management system for managing a database, comprising:

a database storing a plurality of entities related to each other by a plurality of relations, the plurality of entities representing at least one situation in which a user has been involved;

a user interface for interfacing with the database in a current situation;

a server for storing a uniform representation of the entities as at least one artificial intelligence frame, the at least one artificial intelligence frame describing at least one object and action involved in the situation in which the user has been involved and their relationship to each other; and a context modeler which models a context representation of the current situation using the at least one artificial intelligence frame so that when the context representation is applied to the database, operation of the database is adapted according to the current situation.

2. The database management system according to claim 1, wherein the data stored as the at least one artificial intelligence frame contains an observed user behavior.

3. The database management system according to claim 1, wherein the server is a uniform representation server, and wherein the situation stored in the at least one artificial intelligence frame is stored in terms of a uniform representation of the entities stored in the database.

4. The database management system according to claim 3, wherein the uniform representation server is a semantic net server and the at least one artificial intelligence frame comprises a plurality of artificial intelligence frames are stored as a semantic net.

5. The database management system according to claim 1, wherein the server is arranged to store the current situation as the at least one artificial intelligence frame so that in a subsequent situation, the current situation as well as the situation in which the user has been involved are used by the context modeler to model the context for the subsequent situation.

6. The database management system according to claim 1, wherein the at least one artificial intelligence frame includes a plurality of slots in which entities involved in the situation are stored.

7. The database management system according to claim 6, wherein at least one entity in at least one of the slots carries a value indicating the probability of the relation of the entity in the slot with respect to another entity in a related slot, and the context modeler is arranged to assess the value.

8. The database management system according to claim 6, wherein at least one entity in at least one of the slots carries a value indicating the reliability of the relation of the entity in the slot with respect to another entity in a related slot, and the context modeler is arranged to assess the value.

9. The database management system according to claim 6, wherein at least one entity in at least one of the slots carries a value indicating the importance of the relation of the entity in the slot with respect to another entity in a related slot in the situation described by the frame, and the context modeler is arranged to assess the value.

10. The database management system according to claim 6, wherein the at least one entity in at least one of the slots carries a value indicating that the relationship of the entity in the slot with respect to another entity in a related slot is at least one of causal and dependent, and the context modeler is arranged to assess the value.

11. A method of managing a database storing a plurality of entities related to each other by a plurality of relations, the database associated with a user interface, comprising:

storing a plurality of entities representing a situation, in which the user has been involved, as at least one artificial intelligence frame, the at least one artificial intelligence frame describing at least one object and action involved in the situation in which the user has been involved and their relationship to each other; and modeling a context representation of a current situation using the at least one artificial intelligence frame, so that when the context representation is applied to the database, operation of the database is adapted according to the situation.

12. The method according to claim 11, further comprising: storing the situation as the at least one artificial intelligence frame containing an observed user behavior.

13. The method according to claim 11, further comprising: storing the situation in the at least one artificial intelligence frame in terms of a uniform representation of the entities stored in the database.

14. The method according to claim 13, further comprising: storing the at least one artificial intelligence frame comprises storing a plurality of artificial intelligence frames as a semantic net.

15. The method according to claim 11, further comprising: storing the current situation as the at least one artificial intelligence frame, so that in a subsequent situation the current situation as well as the situation in which the user has been involved are used by the context modeler to model the context for the subsequent situation.

16. The method according to claim 11, further comprising: arranging the at least one artificial intelligence frame to include a plurality of slots in which entities are stored which are involved in the situation.

17. The method according to claim 11, further comprising: assigning a value to at least one entity in at least one of the slots indicating the probability of the relation of the entity in the slot with respect to another entity in a related slot, and assessing the value in the modeling step.

18. The method according to claim 11, further comprising: assigning a value to at least one entity in at least one of the slots indicating the reliability of the relation of the entity in the slot with respect to another entity in a related slot.

19. The method according to claim 11, further comprising: assigning a value to at least one entity in at least one of the slots indicates the importance of the relation of the entity in the slot with respect to another entity in a related slot in the situation described by the frame.

20. The method according to claim 11, further comprising: assigning a value to the at least one entity in at least one of the slots indicating that the relationship of the entity in the slot with respect to another entity in a related slot is at least one of causal and dependent.

21. A program storage device readable by a processing apparatus, the device storing instructions executable by the processing apparatus to perform a method of managing a database storing a plurality of entities related to each other by a plurality of relations, comprising:

storing a plurality of entities representing a situation, in which the user has been involved, as at least one artificial intelligence frame, the at least one artificial intelligence frame describing at least one object and action involved in the situation in which the user has been involved and their relationship to each other; and modeling a context representation of a current situation using the at least one artificial intelligence frame so that when the context representation is applied to the database, operation of the database is adapted according to the situation.

* * * * *